(12) United States Patent
Haque

(10) Patent No.: US 7,317,537 B2
(45) Date of Patent: Jan. 8, 2008

(54) SYSTEM AND METHOD FOR RECOVERING LOST DATA IN A GYROSCOPE SENSOR SYSTEM

(75) Inventor: Jamal Haque, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 110 days.

(21) Appl. No.: 11/250,091

(22) Filed: Oct. 13, 2005

(65) Prior Publication Data

US 2007/0086014 A1    Apr. 19, 2007

(51) Int. Cl.
*G01C 19/72* (2006.01)

(52) U.S. Cl. .................................... 356/460

(58) Field of Classification Search .............. 356/459, 356/460, 464
See application file for complete search history.

(56) References Cited

U.S. PATENT DOCUMENTS

| | | | | |
|---|---|---|---|---|
| 4,533,250 A | * | 8/1985 | Callaghan et al. | 356/459 |
| 4,779,975 A | * | 10/1988 | Kim | 356/460 |
| 5,080,489 A | * | 1/1992 | Nishikawa et al. | 356/460 |
| 5,555,235 A | * | 9/1996 | Kumagai et al. | 356/460 |

* cited by examiner

*Primary Examiner*—Samuel A. Turner
(74) *Attorney, Agent, or Firm*—Fogg & Powers LLC

(57) ABSTRACT

A system and method for recovering lost data in an electronic gyroscope sensor system are disclosed, which use a linear adaptive predictive technique for determining what data was lost by the gyroscope sensor system during a disruptive interval involved. More precisely, a system and method for recovering lost data in a fiber optic gyroscope sensor system are disclosed, which continuously predicts "N" future samples of sensor data and stores the last known good "L" sensor values and the calculated "L" coefficients in a non-volatile memory. In the event that the fiber optic gyroscope sensor system becomes inoperable (e.g., due to a temporary loss of power to the gyroscope or other cause of electromechanical failure), and once the gyroscope sensor system resumes operation (e.g., power is reapplied), the stored "L" coefficients are retrieved from the non-volatile memory, and are used to calculate the data lost by the fiber optic gyroscope sensor system during the inoperative period involved. During normal operation, "N" future samples are predicted. Also, while actual sensor data is available, the actual data is compared with the predicted data, and any resulting differences are applied to an adaptive least mean squares algorithm, which updates the coefficients and corrects prediction error in the linear adaptive predictive filter being used.

24 Claims, 4 Drawing Sheets

SYSTEM AND METHOD FOR RECOVERING LOST DATA IN A GYROSCOPE SENSOR SYSTEM

FIELD OF THE INVENTION

The present invention relates generally to the field of electronic gyroscopes, and more specifically, but not exclusively, to a system and method for recovering lost data in an electronic gyroscope sensor system such as, for example, a fiber optic gyroscope sensor system.

BACKGROUND OF THE INVENTION

For many years, electronic gyroscopes have been used in a wide variety of civilian and military aviation, seaborne and aerospace navigation, guidance, and control applications. In that regard, interferometric fiber optic gyroscopes ("fiber optic gyroscopes") are now being used as angular rate sensors for numerous aviation and aerospace applications, such as inertial navigation and guidance, platform stabilization, deductive reckoning, and motion detection and control. Notably, fiber optic gyroscopes are increasingly being used in inertial navigation and guidance applications, because of their ruggedness, compactness, and ability to sense very low rotation rates (problematic for other electronic gyroscopes), especially for such applications where external navigation cues are unavailable or impractical to use. Advantageously, fiber optic gyroscopes can be made quite small, and are constructed to withstand considerable mechanical shock, temperature changes, and other environmental extremes. Also, due to an absence of moving parts, fiber optic gyroscopes are nearly maintenance free and economical in cost to use.

However, notwithstanding the above-described advantages of fiber optic gyroscopes and similar types of electronic gyroscopes, a significant problem that arises in this field is that electronic gyroscopes, compared to the traditional spinning mass-based gyroscopes, do not measure any change if there is a loss of power. For example, fiber optic gyroscopes need to have power applied all of the time, because if power to the fiber optic components is lost, then the fiber optic gyroscope becomes completely inoperable until power to those components is reapplied. Consequently, if there is a loss of power in an aircraft's or spacecraft's navigation system using a fiber optic gyroscope, the fiber optic gyroscope (and similar types of electronic gyroscopes) will be inoperable during that period and unable to sense any movement or rotational change. For example, if such a power disruption were to occur for a relatively short period in a commercial aircraft, it would be extremely important to know where the aircraft traveled during that period of blind flight. Unfortunately, the existing fiber optic gyroscope sensor systems (and similar electronic gyroscope sensors) are unable to recover that missing data. As such, this problem has a significant negative impact on flight safety, navigation and/or space mission success, and also diminishes the potential operational and cost advantages of the electronic gyroscopes being used. Therefore, a substantial need exists for an electronic gyroscope sensor system (e.g., fiber optic gyroscope sensor system) that can resolve the above-described power disruption problem and other similar problems. As described in detail below, the present invention provides a linear adaptive prediction system and method for recovering lost data in, for example, a fiber optic gyroscope sensor system, which resolves the power disruption problems encountered with existing fiber optic gyroscopes and other similar prior art electronic gyroscopes.

SUMMARY OF THE INVENTION

The present invention provides a system and method for recovering lost data in an electronic gyroscope sensor system, which uses a linear adaptive predictive technique for determining what data was lost by the gyroscope sensor system during a disruptive interval involved. In accordance with a preferred embodiment of the present invention, a system and method for recovering lost data in a fiber optic gyroscope sensor system are provided, which continuously predicts "N" future samples of sensor data. For this embodiment, the number of "N" is dependent on the flight profile, A/D sampling frequency, and the performance tolerance of the navigation system. As the linear adaptive predictive system predicts and corrects its predictive "L" filter coefficients, the system stores these calculated coefficients along with the last known good "L" gyroscope sensor output data in a non-volatile memory. Essentially, the system is learning the flight profile, by updating a set of new "L" coefficients as soon as valid data is available. In the event that the fiber optic gyroscope and/or sensor system becomes inoperable (e.g., due to a temporary loss of power or other temporary cause of electromechanical failure), and once the gyroscope sensor system resumes operation (e.g., power is reapplied), the stored "L" coefficients are retrieved from the non-volatile memory, and are used to fill the missing gap in the sensor data. During normal operation, "N" future samples are predicted. After a subsequent "N" samples, the actual sensor value is used as a reference to calculate the predicted error, which (using a least mean squares method) is used to calculate a new set of "L" coefficients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
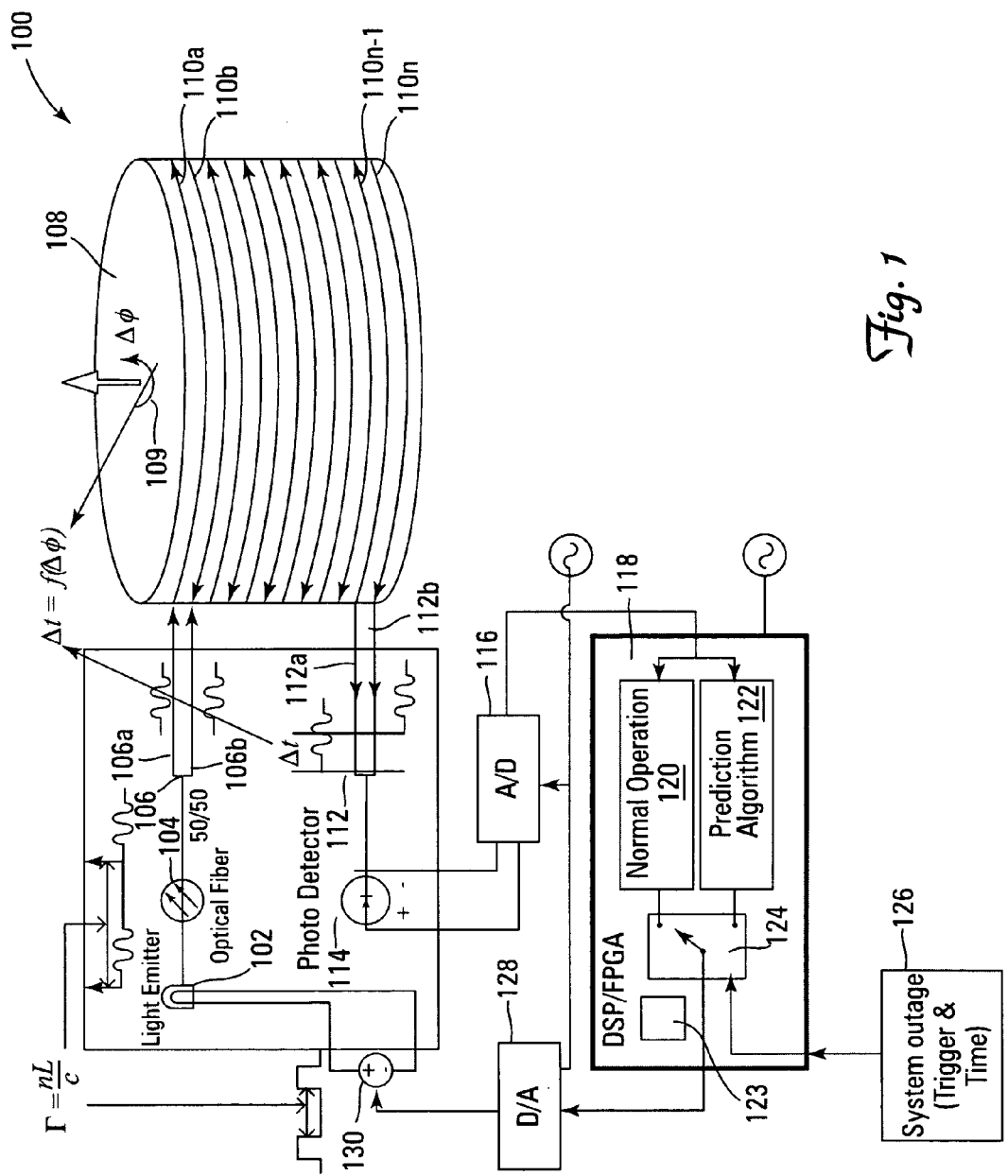
FIG. 1 depicts a block diagram of an example system for recovering lost data in an electronic gyroscope sensor system, which can be used to implement a preferred embodiment of the present invention.

With reference now to the figures, FIG. 1 depicts a block diagram of an example system 100 for recovering lost data in an electronic gyroscope sensor system, which can be used to implement a preferred embodiment of the present invention. For example, the system 100 depicted in FIG. 1 can be used for recovering lost data in an electronic gyroscope sensor system for navigation, guidance and/or control applications in an aircraft, spacecraft, space-based platform, seaborne vehicle (e.g., submarine, ship, boat, etc.), or motor vehicle. In any event, for this example embodiment, the electronic gyroscope sensor system depicted in FIG. 1 represents a fiber optic gyroscope sensor system, which includes a light-emitting device 102 coupled by an optical fiber 104 to an input port of a beam splitter 106. For example, light-emitting device 102 can be a laser light-emitting device, super-luminescent light-emitting diode, rare-earth doped fiber light source, or any other suitable light source that preferably exhibits a short coherence length for the emitted light. The beam splitter 106 includes light transmission media that transmits approximately half of the incoming light from optical fiber 104 to each output port 106a, 106b of beam splitter 106. The substantially coherent beams of light at each output port 106a, 106b are coupled to respective optical fibers 110a, 110b of a fiber optic sensing coil 108. The fiber optic sensing coil 108 includes two lengths of optical fiber (e.g., 100a, 110b) wrapped in opposite directions in a longitudinal direction around the circumference of a spool. In general, there are "n" and "n-1" windings of these two optical fibers wrapped around the spool (e.g., represented by elements 110n and 110n-1). In other words, any suitable number of windings of optical fiber may be used for fiber optic sensing coil 108.

In operation, if fiber optic sensing coil 108 is rotated around its normal axis (e.g., as illustrated by the direction of curved arrow 109), the path of the light beam in one of the two optical fibers 110n, 110n-1 becomes shorter, while the path of the other light beam becomes longer. As a result, the path differences cause a phase shift between the two light beams. These phase-differentiated light beams in optical fibers 110n-1, 110n are coupled to respective input ports 112a, 112b of a beam combiner 112, which includes suitable transmission media to mix the two light signals and produce a mixed electromagnetic (light) signal whose frequency is proportional to the speed of rotation of coil 108 (e.g., known as the "Sagnac Effect"). This mixed light signal is coupled from an output port of beam combiner 112 to a photo detector 114, which converts the light signal received from beam combiner 112 to an analog voltage. Typically, the magnitude of the voltage at the output of photo detector 114 relates to the cosine of the phase difference between the pair of substantially coherent light waves received at input ports 112a, 112b of beam combiner 112. The analog voltage at the output of photo detector 114 is coupled to an input of an A/D converter 116, which converts the incoming analog signal to a suitable digital signal (e.g., a plurality of digital samples).

For this example embodiment, the digital signal at the output of A/D converter 116 (e.g., representing the change in angular velocity or rotational change sensed by fiber optic sensing coil 108) is coupled to a digital processing unit 118. For example, digital processing unit 118 can be a suitable microcontroller, microprocessor, digital processor, or other type of digital processing unit. Preferably, digital processing unit 118 is a Digital Signal Processor (DSP) implemented with one or more suitable field-programmable gate arrays (FPGAs) arranged, for example, in an Application-Specific Integrated Circuit (ASIC). However, it should be understood that the actual type of processing unit used for digital processing unit 118 is not intended as an architectural limitation on the scope of the present invention.

Essentially, as described in more detail below, the digital samples that represent the rotational movement of fiber optic sensing coil 108 as received from A/D converter 116 are provided as an output of the fiber optic gyroscope sensor system during normal operation 120 (e.g., system power is available), and these samples are also provided to an adaptive linear predictive algorithm 122 in order to predict "N" future samples of the rotational movement of fiber optic sensing coil 108 and related predictive coefficients. For this example embodiment, the "L" filter coefficients are stored in a suitable non-volatile memory (e.g., located internally or externally to digital processing unit 118). For illustrative purposes only, an internal non-volatile memory 123 is shown. Thus, as illustrated in this example by the representation of a digital switch 124 shown, during normal operation (e.g., gyroscope sensor system power is available), the digital samples received from A/D converter 116 are coupled (e.g., as control signals) to a D/A converter 128, which converts the input digital signals to suitable analog voltage signals that are provided to power supply 130 to control the operations (e.g., wavelength, frequency) of light-emitting device 102. Also, in accordance with principles of the present invention, during normal operation, the adaptive linear predictive algorithm 122 uses the digital samples received from A/D converter 116 to continuously predict "N" future samples of gyroscope sensor data, which are used against values during normal operation to calculate new filter coefficients. The coefficients are stored and continuously updated (e.g., by overwriting) in the non-volatile memory 123.

However, for this example embodiment, if the fiber optic gyroscope sensor system experiences a system outage (e.g., as illustrated by block 126), then digital switch 124 is set so as to provide correction in accordance with the method of the present invention (e.g., retrieved by digital processing unit 118 from the non-volatile memory 123) as an output of the fiber optic gyroscope sensor system, in order to fill the data gaps that resulted due to the disruption of sensor system operations that occurred during the disrupted interval of time. For this example, these retrieved, predicted data samples are coupled to D/A converter 128 and supply 130 by switch 124. Notably, as an aside, the actual number of predicted coefficients stored in the non-volatile memory 123 is a predetermined number, which can be limited based on the potentially longest interval of time that the sensor system might be down and required system performance.

Figure 2:
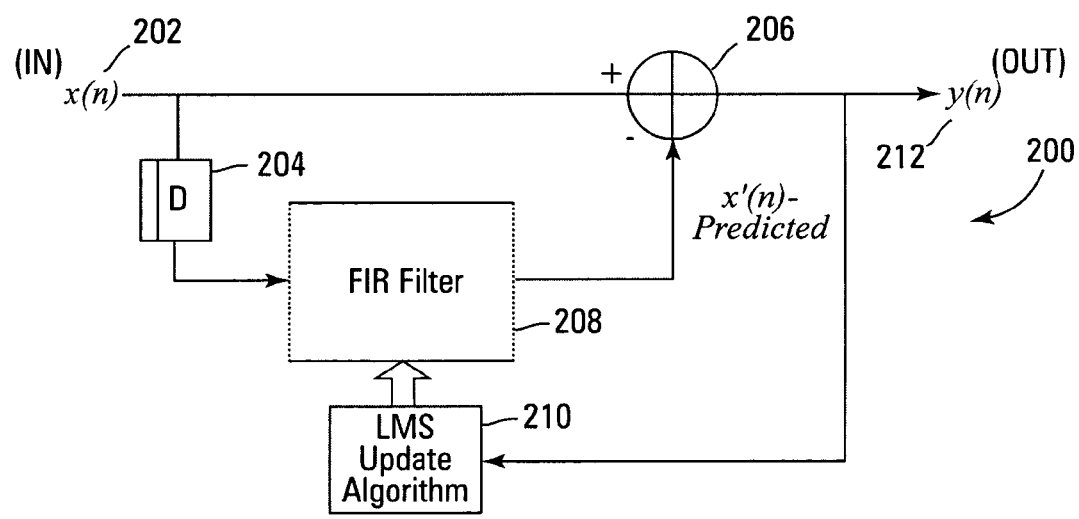
FIG. 2 depicts a block diagram of an example adaptive digital filter system that can be used for linear prediction of "N" future samples and "L" coefficients of the rotational movement of a fiber optic sensing coil, in accordance with a preferred embodiment of the present invention.

FIG. 2 depicts a block diagram of an example adaptive digital filter system 200 that can be used for linear prediction of the above-described "N" future samples of the rotational movement of fiber optic sensing coil 108. As shown for this example embodiment, linear adaptive digital filter system 200 (e.g., representing prediction algorithm 122 in FIG. 1) can be implemented using a transversal FIR filter, but the present invention is not intended to be so limited and can also be implemented using other suitable types of adaptive digital filters (e.g., IIR digital filter, etc.).

Generally, for this example embodiment, the coefficients of the adaptive filter model can be determined by maximizing the statistical correlation between the desired signal and the filter coefficients. This function can be accomplished by minimizing the correlation between the error signal and the filter state as it relates to the coefficients. As the adaptive filter is operating, the error signal decreases in magnitude, which slows down the movement of the coefficients as the filter converges. More precisely, referring to the adaptive digital filter system 200 shown in FIG. 2 for this example embodiment, the input signal, $x(n)$ 202, is coupled to a delay 204 and the delayed input signal is applied to FIR filter 208. Thus, for linear prediction, the adaptive filter uses a delayed version of the input signal 202 as the desired (reference) signal. The input signal 202 is also coupled to a positive input of an algebraic summer 206. An output of the FIR filter 208 (e.g., including the predicted signal x̂ (n)) is coupled to a negative input of summer 206. For this embodiment, the output signal, y(n) 212, is fed back to a least mean squares update algorithm 210, which produces an error signal that is used to update, and/or correct any errors in, the coefficients of the FIR filter 208. Thus, while actual sensor data is available for the FIR filter 208, the predicted values are compared with the actual values, and the differences are fed back to the least mean squares update algorithm 210 and used to update the coefficients of FIR filter 208. Notably, any suitable digital filter coefficient update technique may be used to perform the primary functions of least mean squares update algorithm 210. However, an example least mean squares algorithm that can be used to perform the functions of least mean squares update algorithm 210 is described in Appendix I.

Figure 5:
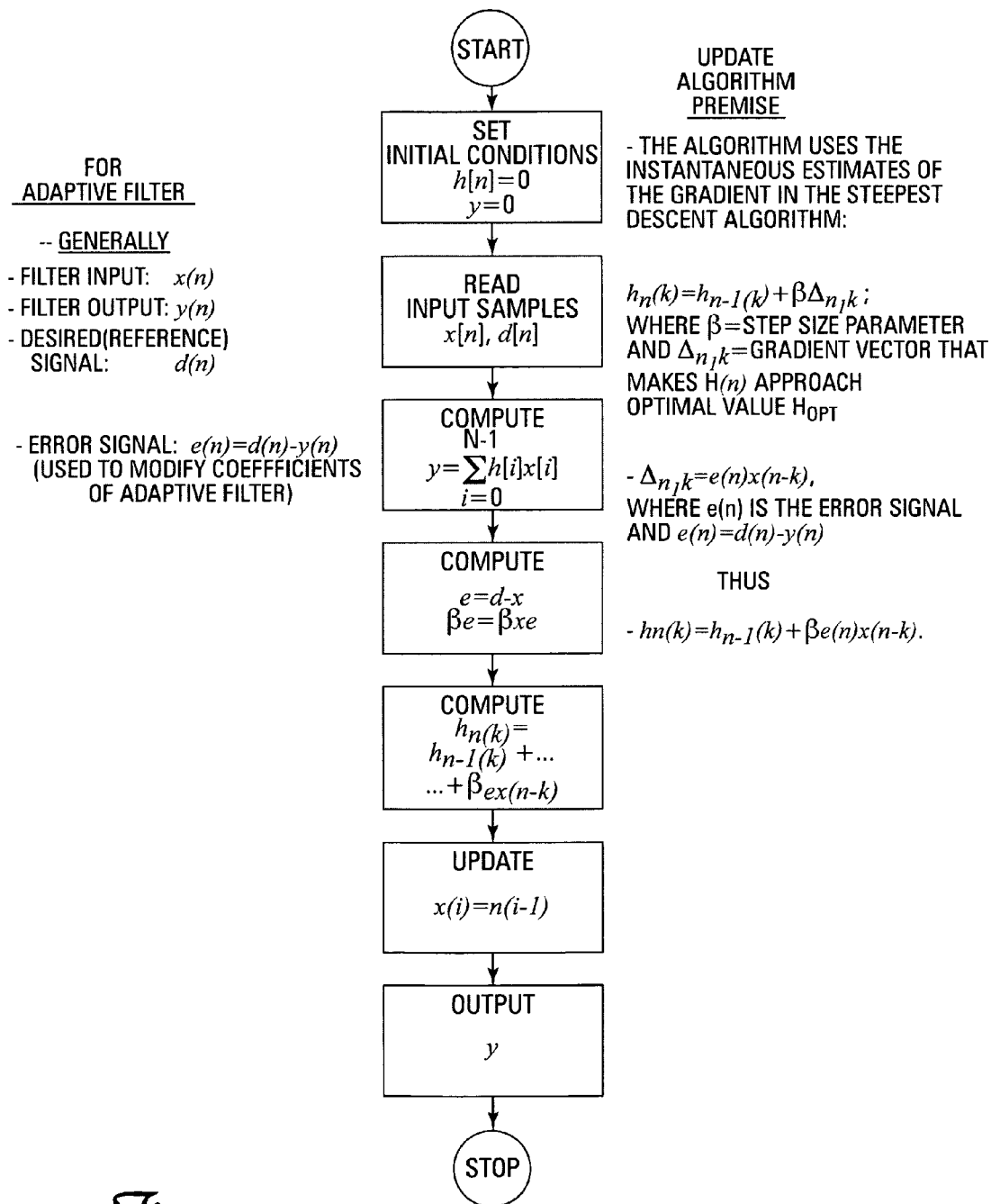
FIG. 5 is a flow chart of a least mean squares algorithm that can be used to perform the functions of least mean squares update algorithm 210.

FIG. 5 is a flow chart of a least mean squares algorithm that can be used to perform the functions of least mean squares update algorithm 210 referred to herein after as Appendix I.

Figure 3:
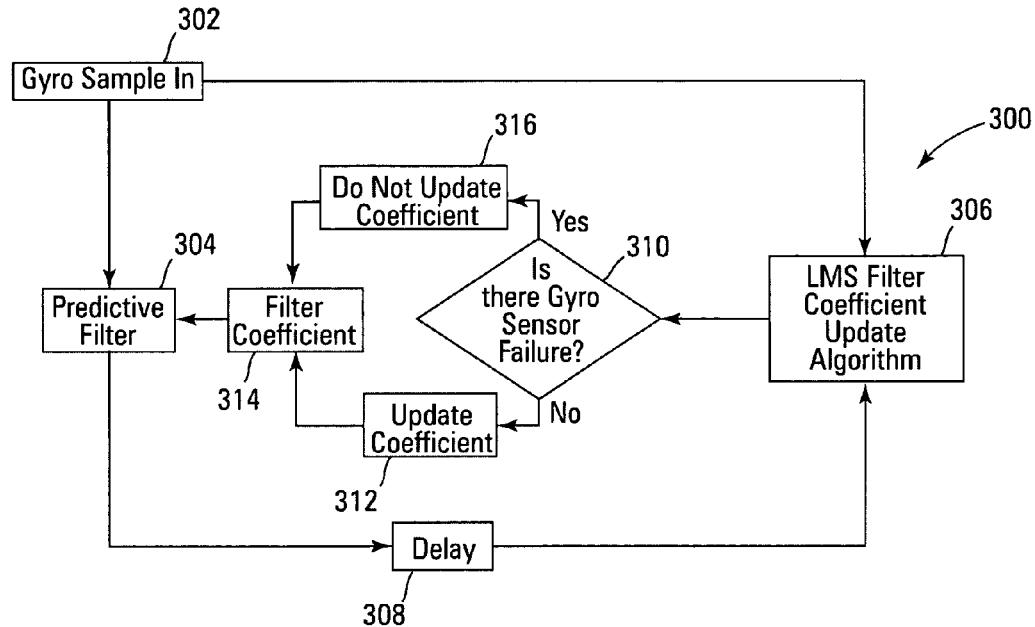
FIG. 3 depicts a flow chart showing an example method for recovering lost data in an electronic gyroscope sensor system, in accordance with a preferred embodiment of the present invention.

FIG. 3 depicts a flow chart showing an example method 300 for recovering lost data in an electronic gyroscope sensor system (e.g., the fiber optic gyroscope sensor system shown in FIG. 1), in accordance with a preferred embodiment of the present invention. Referring to FIGS. 1-3 for this example embodiment, the method starts at step 302, whereby a sample of gyroscope sensor data is input to a predictive filter (step 304) and a least mean squares filter coefficient update algorithm (step 306). For example, the predictive filter can represent adaptive FIR filter 208, and the least mean squares filter coefficient update algorithm can represent least mean squares update algorithm 210. Also, the signal from the predictive filter is coupled to a delay (step 308), and the delayed signal is provided as an input to the least mean squares filter coefficient update algorithm (returning to step 306). Next, a processing unit (e.g., digital signal processing unit 118) determines whether or not the gyroscope sensor and/or sensor system is inoperable (step 310). If not (e.g., normal operation), then the processing unit provides the coefficient update data from the least mean squares filter coefficient update algorithm to the adaptive filter involved (step 312). The updated filter coefficient data is then input to the predictive filter (step 314) and stored in non-volatile memory (e.g., 123).

Figure 4:
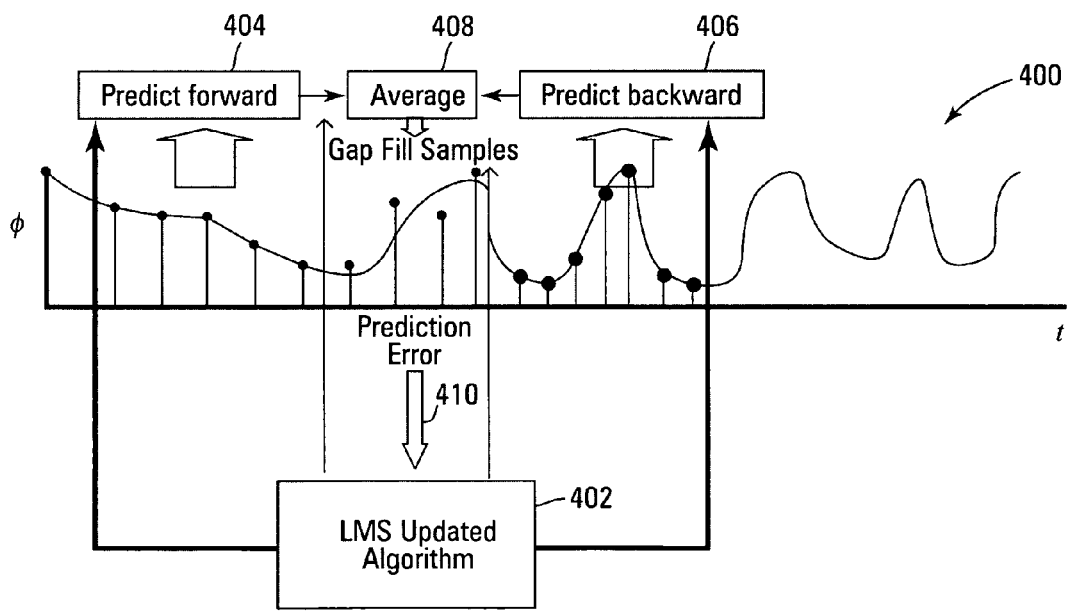
FIG. 4 depicts a graph that illustrates an example linear adaptive predictive filter coefficient update process, in accordance with a preferred embodiment of the present invention.

Returning to step 310 for this example embodiment, if the processing unit determines that the gyroscope sensor and/or sensor system has failed (e.g., temporary loss of power to the gyroscope sensor components and/or the sensor system, etc.), then the processing unit does not update the coefficient data (step 316). Also, as an option, the sensing unit could function to set a flag when the sensing unit is recovering from a power failure, and use the pre-stored coefficient(s) in the non-volatile memory to perform the correction. Thus, in accordance with teachings of the present invention, the processing unit can retrieve some or all of the "N" lost gyroscope sensor data using the stored filter coefficient(s) from the non-volatile memory and recreate the lost sensor data using the stored filter coefficient(s). At this point, it is useful to further illustrate the linear adaptive predictive filter technique of the present invention, by referring now to FIG. 4. For this example embodiment, a linear adaptive predictive filter coefficient update process 400 is shown, which includes a least mean squares update algorithm 402. During normal operation, the least mean squares update algorithm 402 is used in conjunction with an adaptive filter to predict "N" future samples (forward) 404 and update the coefficient against the error. For this example embodiment, the coefficient represents the flight profile, since the coefficient will be constantly calculated for a new one in normal operation. After a power failure and the sensor system is returned to operation, the sensor starts outputting sensed values, and these post-event samples will be used with pre-stored coefficient(s) to calculate lost sensor data (e.g., working backward 406). Similarly, the last known good "L" samples stored along with the filter coefficient(s) are used to calculate the lost samples during the power disruption period. These two sets of values used to fill in the gap in sensor data are then averaged for better precision (408). The prediction error 410 is used by the least means squares update algorithm 402 to correct any errors in the predicted future samples 404.

In summary, in accordance with the present invention, the example linear adaptive digital filter system 200 shown in FIG. 2 can be used to recover lost data in an electronic gyroscope sensor system (e.g., the fiber optic gyroscope sensor system in FIG. 1), by continuously predicting "N" future samples during normal operations and storing the calculated filter coefficient in a non-volatile memory. In the event that the gyroscope sensor components and/or gyroscope sensor system becomes inoperable (e.g., due to a temporary loss of power or other cause of temporary electrical and/or mechanical failure), and once the gyroscope resumes operation (e.g., power is reapplied), the stored filter coefficients are retrieved from the non-volatile memory, and the filter is operated with these retrieved coefficients to fill in the lost samples by the gyroscope system during the inoperative time interval involved. As such, during normal operation, "N" future samples are predicted. Typically, the value of "N" is determined by a navigation system engineer's decision about what level of system precision is acceptable and/or required. During normal operations while actual gyroscope sensor data is available, the actual data is compared with the predicted data, and resulting differences are applied to an adaptive least mean squares algorithm, which updates the coefficients and corrects prediction error in the linear adaptive predictive filter being used. This linear adaptive predictive feature is a key function provided by the present invention.

It is important to note that while the present invention has been described in the context of a fully functioning electronic gyroscope sensor system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular electronic gyroscope sensor system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for recovering lost data in a gyroscope sensor system, comprising:
   a movement sensing unit associated with the gyroscope sensor system, said movement sensing unit configured to output a first signal including a phase component responsive to a movement sensed by said movement sensing unit;
   a detecting unit coupled to said movement sensing unit, said detecting unit configured to detect said phase component of said first signal from said movement sensing unit and output a second signal associated with said phase component;
   a memory unit coupled to an output of said detecting unit, said memory unit configured to store a plurality of samples of said second signal; and
   a processing unit coupled to said memory unit, said processing unit configured to:
   execute an adaptive filter algorithm to predict a plurality of future samples of said second signal; and
   store said plurality of future samples of said second signal in said memory unit.

2. The system of claim 1, wherein said gyroscope sensor system comprises an electronic gyroscope sensor system.

3. The system of claim 1, wherein said gyroscope sensor system comprises a fiber optic gyroscope sensor system.

4. The system of claim 1, further comprising:
   a light-emitting unit coupled to an input of said movement sensing unit.

5. The system of claim 1, further comprising:
   a converting unit coupled to said output of said detection unit and an input of said memory unit, said converting unit configured to convert said second signal from an analog signal to a digital signal.

6. The system of claim 1, wherein said processing unit is further configured to:
   execute a filter coefficient update algorithm; and
   include at least one filter coefficient update error signal responsive to an execution of said filter coefficient update algorithm, as an update parameter for said adaptive filter algorithm.

7. The system of claim 1, wherein said adaptive filter algorithm comprises a linear adaptive predictive digital filter.

8. The system of claim 1, wherein said processing unit is further configured to:
   execute a least mean squares filter coefficient update algorithm; and
   include at least one filter coefficient update error signal responsive to an execution of said least mean squares filter coefficient update algorithm, as an update parameter for said adaptive filter algorithm.

9. The system of claim 1, wherein said adaptive filter algorithm comprises a FIR filter algorithm.

10. The system of claim 1, wherein said adaptive filter algorithm comprises a transversal FIR filter algorithm.

11. The system of claim 1, wherein said adaptive filter algorithm comprises an adaptive IIR filter algorithm.

12. The system of claim 1, wherein said movement sensing unit comprises a gyroscope sensing coil.

13. The system of claim 1, wherein said movement sensing unit comprises a fiber optic gyroscope sensing coil.

14. The system of claim 1, wherein said detecting unit comprises a photo detector.

15. The system of claim 1, wherein said processing unit is further configured to:
   retrieve at least one future sample of said plurality of future samples of said second signal from said memory unit; and
   substitute said at least one future sample for at least one current sample of said second signal, if an operation of said gyroscope sensor system is disrupted.

16. A system for recovering lost data in a gyroscope sensor system, comprising:
   means for sensing a rotational movement and outputting a first signal including a phase component responsive to said rotational movement;
   means, coupled to said means for sensing, for detecting said phase component of said first signal and outputting a second signal associated with said phase component;
   memory means, coupled to said means for detecting, for storing a plurality of samples of said second signal; and
   means, coupled to said memory means, for predicting a plurality of future samples of said second signal, and storing said plurality of future samples of said second signal in a memory location associated with said memory means.

17. A method for recovering lost data in a gyroscope sensor system, comprising the steps of:
   receiving a plurality of first signals from a gyroscope sensor unit, said plurality of first signals associated with a rotational movement of said gyroscope sensor unit;
   coupling said plurality of first signals to an adaptive predictive filter;
   predicting a plurality of second signals associated with a future rotational movement of said gyroscope sensor unit; and
   storing said plurality of second signals.

18. The method of claim 17, further comprising the steps of:
   coupling said plurality of first signals to a filter coefficient update unit;
   determining if an error exists for at least one second signal of said plurality of second signals; and
   if an error exists for said at least one second signal, updating at least one coefficient of said adaptive predictive filter so as to compensate for said error.

19. The method of claim 17, further comprising the steps of:
   determining if a disruption of an operation of said gyroscope sensor system has occurred; and
   if so, retrieving said stored plurality of second signals.

20. The method of claim 18, further comprising the steps of:
   determining if a disruption of an operation of said gyroscope sensor system has occurred; and
   if so, not updating said at least one coefficient of said adaptive predictive filter.

21. A computer program product, comprising:
   a computer-usable medium having computer-readable code embodied therein for configuring a computer processor, the computer program product comprising:
   a first executable computer-readable code configured to cause a computer processor to receive a plurality of first signals from a gyroscope sensor unit, said plurality of first signals associated with a rotational movement of said gyroscope sensor unit;

a second executable computer-readable code configured to cause a computer processor to couple said plurality of first signals to an adaptive predictive filter;

a third executable computer-readable code configured to cause a computer processor to predict a plurality of second signals associated with a future rotational movement of said gyroscope sensor unit; and a fourth executable computer-readable code configured to cause a computer processor to store said plurality of second signals.

22. The computer program product of claim 21, further comprising:

a fifth executable computer-readable code configured to cause a computer processor to couple said plurality of first signals to a filter coefficient update unit;

a sixth executable computer-readable code configured to cause a computer processor to determine if an error exists for at least one second signal of said plurality of second signals; and a seventh executable computer-readable code configured to cause a computer processor to update at least one coefficient of said adaptive predictive filter, if an error exists for said at least one second signal.

23. The computer program product of claim 21, further comprising:

an eighth executable computer-readable code configured to cause a computer processor to determine if a disruption of an operation of said gyroscope sensor system has occurred; and a ninth executable computer-readable code configured to cause a computer processor to retrieve said stored plurality of second signals, if said disruption has occurred.

24. The computer program product of claim 21, further comprising:

a tenth executable computer-readable code configured to cause a computer processor to determine if a disruption of an operation of said gyroscope sensor system has occurred; and an eleventh executable computer-readable code configured to cause a computer processor to not update said at least one coefficient of said adaptive predictive filter, if said disruption has occurred.

* * * * *